No. 613,454. Patented Nov. 1, 1898.
P. MADDOCKS.
SIDEHILL GANG PLOW.
(Application filed May 20, 1898.)

(No Model.)

Witnesses,

Inventor,
Peter Maddocks
By Dewey Strong & Co.
Atty.

UNITED STATES PATENT OFFICE.

PETER MADDOCKS, OF TRACY, CALIFORNIA.

SIDEHILL GANG-PLOW.

SPECIFICATION forming part of Letters Patent No. 613,454, dated November 1, 1898.

Application filed May 20, 1898. Serial No. 681,182. (No model.)

*To all whom it may concern:*

Be it known that I, PETER MADDOCKS, a citizen of the United States, residing at Tracy, county of San Joaquin, State of California, have invented an Improvement in Sidehill Gang-Plows; and I hereby declare the following to be a full, clear, and exact description of the same.

My invention relates to a plow which is especially adapted for work upon sidehills; and it consists, essentially, of a triangular frame mounted upon suitable bearing-wheels, with means for their adjustment, and having a double series of plows connected with the opposite sides of the frame, the standards of said plows being so hinged that those upon either side may be turned up free of the ground while the others are at work, thus enabling the plow to be worked upon hillsides and turn the furrow down the hill when going in either direction.

The invention also comprises details of construction which will be more fully explained by reference to the accompanying drawings, in which—

Figure 1:
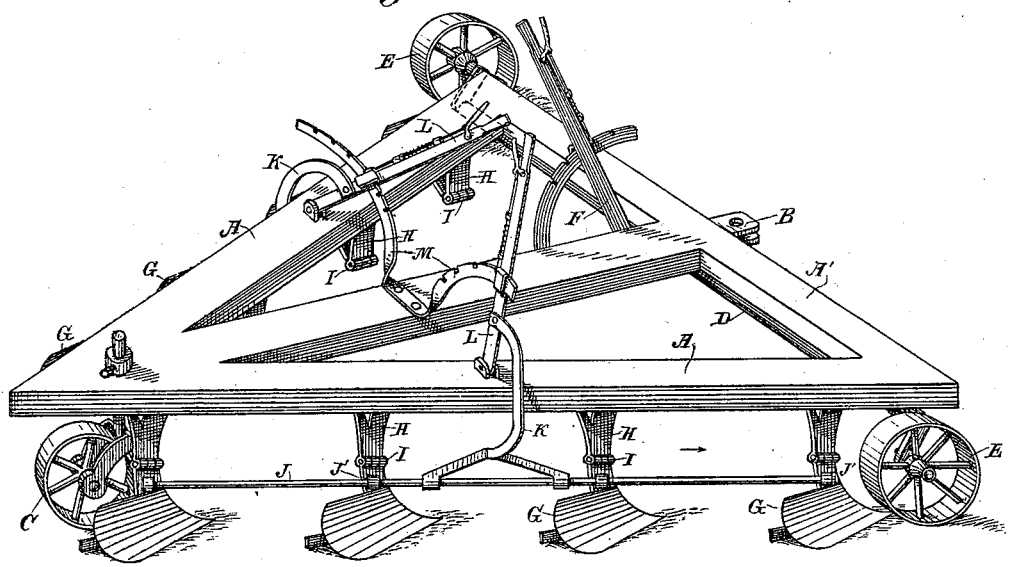
Figure 2:
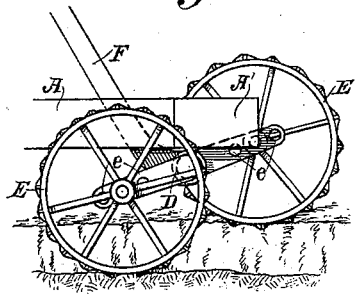

Figure 1 is a general view of the apparatus. Fig. 2 is a side elevation of the front end of the same.

Gang-plows as hitherto constructed have been limited in their usefulness to comparatively level ground; and it is the object of my invention to provide a plow of this character which can be used upon hillsides, so as to turn a furrow when traveling in either direction.

A A are the diverging beams of a triangular framework suitably constructed, having a front beam A', which forms the base of the triangle and to which the team is to be attached at the front by means of any suitable doubletrees or connecting mechanism, as indicated at B; or the apparatus may be so constructed as to be propelled by steam, electric, or other power which may be applicable for the purpose.

The rear or converging end of the triangular frame is supported upon a swivel steering-wheel C, and the front end has a shaft D, extending beneath the beam A' from one side to the other. The ends of the shaft are cranked, as shown, and upon each of these crank-axles is journaled a bearing-wheel E. The crank-axles upon which these wheels are journaled are bent in the opposite direction, as shown, and the central portion of the shaft has connected with it a lever F, which may be engaged with any suitable holding-rack, so that it may be turned and held in any desired position. By this construction I am enabled to bring the wheels in position for travel over the ground when the plows are not at work, in which case it is desirable to support the plow-frame at an approximately equal distance from the ground; but when the plows are at work one of the wheels E is depressed, so as to run in the furrow, while the other is correspondingly thrown up to run upon the land and still retain the proper position of the framework.

The bearing-wheels are made, as shown, with projections radially beyond the rim, which will take hold of the ground, and intermediate between these projections or grousers are inclined or V-shaped surfaces, as shown in Fig. 2, which form a bearing upon which the weight of the machine rests.

The plows G are of any usual or suitable pattern and have standards H, by which they are secured upon the side timbers A of the frame. There are two series of these plows, one upon each side timber, and those upon either side are so mounted with relation to each other that when in action they will turn successive furrows. It will be understood that when the plows upon one side are in operation those upon the opposite side may be thrown out of action. This is effected by hinging the standards H, as shown at I, the hinges extending in the direction of travel of the plows and having sufficient stiffness to resist any strain which may be brought upon them. At the same time the plows G are turnable transversely about these hinges at will.

Various devices may be employed for turning the plows. In the present case rods or bars J connect the series of plows upon either side by attachments or lugs J', and to each of these rods at some central point is connected a link or connecting-rod K, the upper end of which extends above the frame A and is connected with a lever L. Each of these sets of plows on the opposite sides of the frame have an actuating-lever L and a rack M, with which it may be engaged and locked. Thus when the plow is being driven upon the side-hill, moving in the direction shown by the arrows, those plows which are upon the lower side will be in operation and turning furrows, which fall down the hill. The plows upon the opposite side are disengaged by moving the lever L, connected with them, so as to turn the plows about their joints I and throw the plow-shares up away from the ground.

In the plow thus constituted the work is carried on by first engaging one set of plows while driving along the hillside until the end of the furrow is reached. Then the plow is turned around, and when driving back upon the opposite side the other set of plows would be let down and engaged and the first ones thrown up out of engagement, the furrows being again turned as before in unison with the previously-turned furrows.

In order to regulate the position of the wheels E and adjust them to any depth of furrow, the crank-arms of the shafts D are bored or slotted, as shown at e, to receive the shafts of the wheels E, and these shafts may be moved nearer to or farther from the shaft, so as to change the movement of the wheels E, and thus accommodate them to any depth of furrow which it may be desired to plow.

Having thus described my invention, what I claim as new, and desire to secure by Letters Patent, is—

1. A plow-frame having plows mounted thereon and adapted to turn furrows in opposite directions, and means including plow-standards hinged at points in their length whereby the plows upon either side may be turned up and disengaged independent of those upon the opposite side.

2. In a plow, a frame having a series of plows upon each side facing in opposite directions, and means including plow-standards hinged at points in their lengths and connecting devices whereby one series may be simultaneously thrown out of action while the other is at work.

3. A triangular plow-frame having a series of plows fixed upon each side adapted to turn furrows in opposite directions, said plows having the standards hinged, and mechanism whereby the plows of either series may be turned up out of action, while the others are in operative condition.

4. A plow-frame having a series of plows upon each side adapted to turn furrows in opposite directions, joints or hinges formed in the standards of the plows, rods connecting the portion below the hinges so that they may be moved simultaneously, a lever and holding-rack and a rod or link connecting the lever with the movable portion of the plow.

5. A gang-plow consisting of a triangular frame having a series of plows mounted upon each side adapted to turn furrows in opposite directions, hinges in the standards of said plows, connections by which each series are united together below the joints, a link connecting each united series with an independent lever whereby either series may be turned up simultaneously, and holding-racks by which they are retained in or out of action.

6. In a gang-plow of the character described, two series of plows fixed upon opposite sides of the frame adapted to turn furrows in opposite directions, plow-standards hinged at points in their length and means connecting the plows in series for throwing either series of plows simultaneously out of action or into position for work, a bearing-wheel for the rear of the frame and other bearing-wheels mounted upon a shaft having crank-axles extending through opposite sides of the shaft at its ends and means for turning said crank-shaft so as to raise one wheel and depress the other simultaneously.

In witness whereof I have hereunto set my hand.

PETER MADDOCKS.

Witnesses:
S. H. NOURSE,
GEO. H. STRONG.